United States Patent
Cheung et al.

(10) Patent No.: US 11,811,823 B2
(45) Date of Patent: Nov. 7, 2023

(54) COMPLETE DATA EXFILTRATION PROFILE AND MODEL (CODAEX)

(71) Applicant: United States of America as represented by the Secretary of the Navy, San Diego, CA (US)

(72) Inventors: Jennifer Miuling Cheung, San Diego, CA (US); Antonio Monje, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 360 days.

(21) Appl. No.: 17/386,073

(22) Filed: Jul. 27, 2021

(65) Prior Publication Data

US 2023/0031780 A1     Feb. 2, 2023

(51) Int. Cl.
  *H04L 29/06*     (2006.01)
  *H04L 9/40*      (2022.01)

(52) U.S. Cl.
  CPC ...... *H04L 63/1466* (2013.01); *H04L 63/1416* (2013.01); *H04L 63/1425* (2013.01)

(58) Field of Classification Search
  CPC ............... H04L 63/1466; H04L 63/1416
  See application file for complete search history.

(56) References Cited

U.S. PATENT DOCUMENTS

| 9,363,282 | B1* | 6/2016 | Yu ................... H04L 63/0218 |
| 10,911,471 | B1* | 2/2021 | Song .................... G06N 20/00 |
| 2016/0359881 | A1* | 12/2016 | Yadav ..................... H04L 1/242 |
| 2017/0262633 | A1* | 9/2017 | Miserendino .......... G06N 5/025 |

OTHER PUBLICATIONS

K. Vahedi, M. Abbaspour, K. Afhamisisi, and M. Rashidnejad; "Behavioral Entropy Towards Detection of Metamorphic Malwares," 2019 9th International Conference on Computer and Knowledge Engineering (ICCKE), 2019, pp. 78-84, doi: 10.1109/ICCKE48569.2019.8964967.

(Continued)

*Primary Examiner* — Jason K Gee
(74) *Attorney, Agent, or Firm* — Naval Information Warfare Center, Pacific; Kyle Eppele; J. Eric Anderson

(57) ABSTRACT

A method for identifying data exfiltration attempts on a computer network comprising the following steps: identifying malicious data exfiltration behaviors (DEBs) for known adversary tactics in a knowledge base; identifying benign DEBs; comparing the malicious DEBs with the benign DEBs to identify network features that indicate malicious DEB; calculating, with a network analyzer, an entropy value for each identified network feature; establishing a threshold based on the calculated entropy values; building a complete profile of DEB based on the benign and malicious DEBs; adding every network feature having an entropy value greater than the threshold to a model; comparing the model to live network traffic; and flagging behavior in the live network traffic as a malicious DEB if such behavior includes a network feature that has an entropy value greater than the threshold regardless of whether or not the flagged behavior was previously recognized as a malicious DEB.

16 Claims, 3 Drawing Sheets

(56) References Cited

OTHER PUBLICATIONS

S. Gianvecchio and H. Wang; "An Entropy-Based Approach to Detecting Covert Timing Channels," in IEEE Transactions on Dependable and Secure Computing, vol. 8, No. 6, pp. 785-797, Nov.-Dec. 2011, doi: 10.1109/TDSC.2010.46.

A. Al-Bataineh and G. White; "Analysis and detection of malicious data exfiltration in web traffic," 2012 7th International Conference on Malicious and Unwanted Software, 2012, pp. 26-31, doi: 10.1109/MALWARE.2012.6461004.

B. Sabir et al.; "Machine Learning for Detecting Data Exfiltration: A Review," arXiv:2012.09344v2 [cs.CR] Mar. 21, 2021.

A. Romero; "Prevent Data Exfiltration with Network Traffic Analytics," Logrythm.com blog, available at https://logrhythm.com/blog/prevent-data-exfiltration-with-network-traffic-analytics/; May 7, 2020.

\* cited by examiner

COMPLETE DATA EXFILTRATION PROFILE AND MODEL (CODAEX)

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 113598.

BACKGROUND OF THE INVENTION

The invention described and claim herein relates to methods and systems for identifying data exfiltration attempts. Previously, identifying data breaches on a system, would, on average, take longer than 200 days from the date of the breach. After a breach is identified it currently, takes over two months, on average to contain the breach. These advanced persistence threats (APTs) can cause immense damage to computing systems and great financial and technical loss of intellectual property. Most current anti-virus, intrusion detection systems (IDS) and intrusion prevention systems (IPS) have an extremely difficult time detecting new types of polymorphic malicious threats. Typically, the ultimate goal of these malicious attacks is to retrieve valuable data from internal information networks. There is a need for an improved method and system for detecting data exfiltration attempts.

SUMMARY

Disclosed herein is a method for identifying data exfiltration attempts on a computer network comprising the following steps. One step provides for identifying malicious data exfiltration behaviors corresponding to all known adversary tactics and techniques stored in a knowledge base. Another step provides for identifying benign data exfiltration behaviors corresponding to emulated benign network traffic behaviors. Another step provides for comparing the malicious data exfiltration behaviors with the benign data exfiltration behaviors to identify network features that indicate malicious data exfiltration activity. Another step provides for calculating, with a network analyzer, an entropy value for each identified network feature. Another step provides for establishing an entropy threshold value based on the calculated entropy values for the identified network features. Another step provides for building a complete profile of data exfiltration behavior based on the benign and malicious data exfiltration behaviors. Another step provides for adding every network feature having an entropy value greater than the entropy threshold value to a malicious data exfiltration model. Another step provides for comparing the malicious data exfiltration model to live network traffic. Another step provides for flagging any and all behavior in the live network traffic as a malicious data exfiltration attempt if such behavior includes a network feature that has an entropy value greater than the entropy threshold value regardless of whether or not the flagged behavior was previously recognized as a malicious data exfiltration attempt.

The data exfiltration detection method disclosed herein may be performed by a system comprising a network traffic analyzer, a memory, and a processor. The network traffic analyzer is configured to build a complete profile of data exfiltration behavior based on benign network traffic behavior and known malicious network traffic behavior. The network traffic analyzer is further configured to calculate an entropy value for every behavior in the complete profile. The memory is configured to store the complete profile. The processor is communicatively coupled to the memory and configured to receive live network traffic. The processor is further configured to add every behavior in the complete profile having an entropy value greater than a threshold value to a malicious data exfiltration model. The processor is further configured to compare the malicious data exfiltration model to the live network traffic, and the processor is configured to flag any and all behavior in the live network traffic as a malicious data exfiltration attempt if the behavior has an entropy value greater than the threshold value regardless of whether or not the flagged behavior was previously known to be a malicious data exfiltration attempt.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
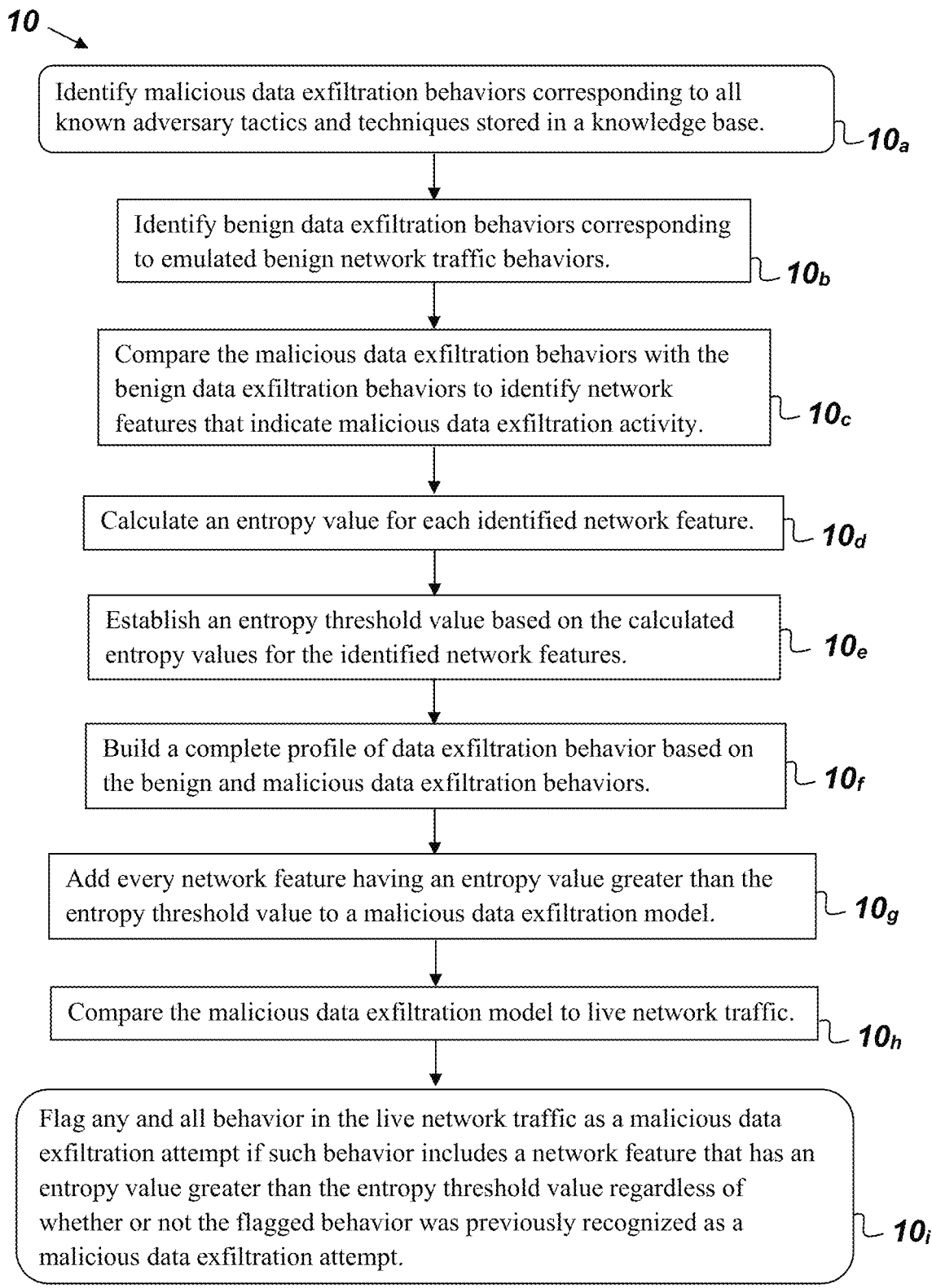
FIG. 1 is a flowchart of an embodiment of a method for identifying data exfiltration attempts on a computer network.

FIG. 1 is a flowchart of a method 10 for identifying data exfiltration attempts on a computer network. Method 10 comprises, consists of, or consists essentially of the following steps. Step $10_a$ provides for identifying malicious data exfiltration behaviors corresponding to all known adversary tactics and techniques stored in a knowledge base. Step $10_b$ provides for identifying benign data exfiltration behaviors corresponding to emulated benign network traffic behaviors. Step $10_c$ provides for comparing the malicious data exfiltration behaviors with the benign data exfiltration behaviors to identify network features that indicate malicious data exfiltration activity. Step $10_d$ provides for calculating, with a network analyzer, an entropy value for each identified network feature. Step $10_e$ provides for establishing an entropy threshold value based on the calculated entropy values for the identified network features. Step $10_f$ provides for building a complete profile of data exfiltration behavior based on the benign and malicious data exfiltration behaviors. Step $10_g$ provides for adding every network feature having an entropy value greater than the entropy threshold value to a malicious data exfiltration model. Step $10_h$ provides for comparing the malicious data exfiltration model to live network traffic. Step $10_i$ provides for flagging any and all behavior in the live network traffic as a malicious data exfiltration attempt if such behavior includes a network feature that has an entropy value greater than the entropy threshold value regardless of whether or not the flagged behavior was previously recognized as a malicious data exfiltration attempt.

Method 10 may be used to measure and identify data exfiltration attempts and to build a general and complete network behavioral profile of data exfiltration. The complete network behavioral profile can be used to detect and monitor malicious data exfiltration attempts and to automate a response to stop data leaks in the future. Embodiments of method 10 may be used to dynamically detect data exfiltration from trusted networks in a shorter amount of time that previous methods and thus increases defense against malicious cyber-attacks. Method 10 may be used to detect data exfiltration that is normally hidden in normal network traffic patterns.

Figure 2:
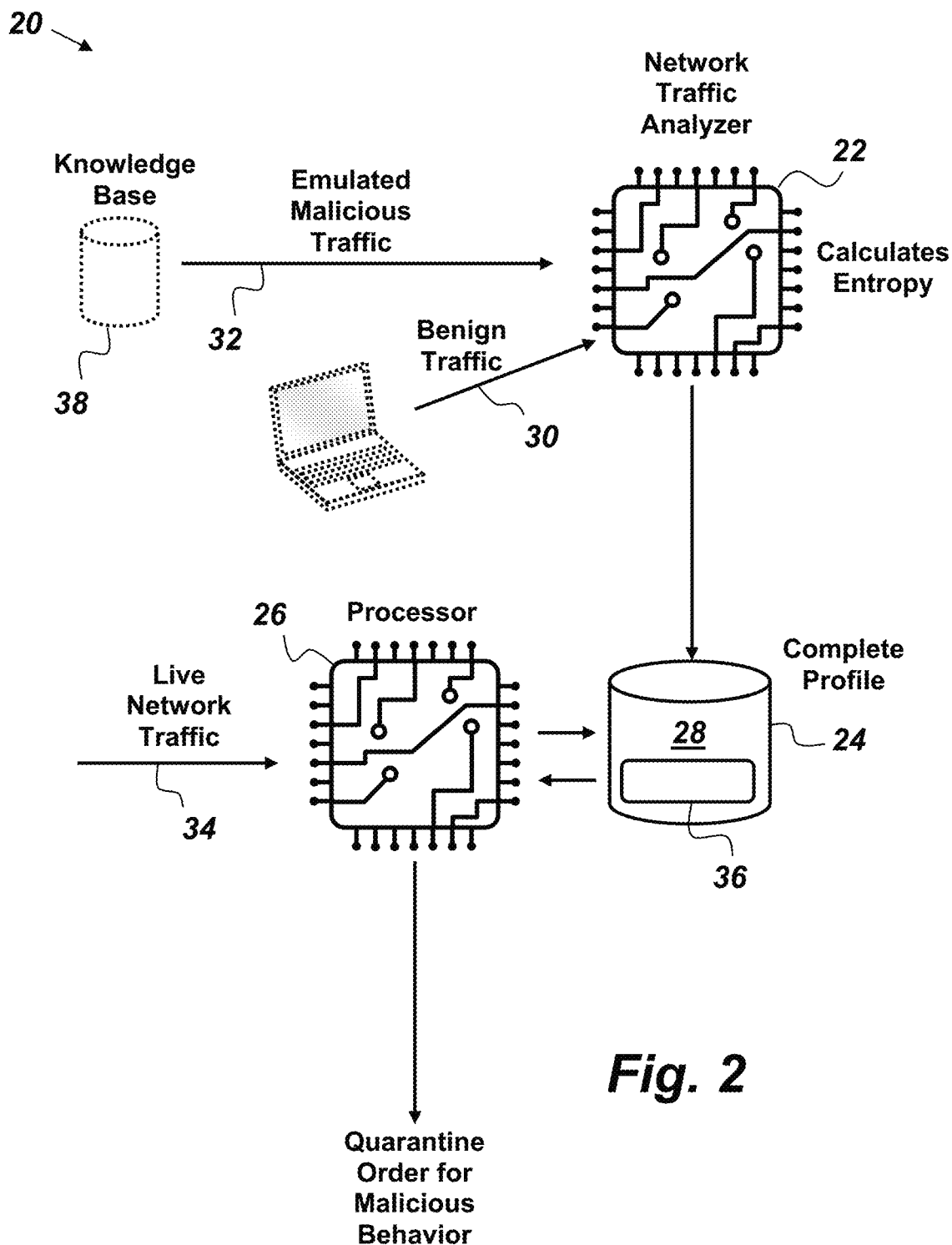
FIG. 2 is an illustration of a system for identifying data exfiltration attempts on a computer network.

FIG. 2 is schematic diagram of an example embodiment of a system 20 that may be used to implement method 10. System 20 comprises, consists of, or consists essentially of a network traffic analyzer 22, a memory 24, and a processor 26. The network traffic analyzer 22 is configured to build a complete profile 28 of data exfiltration behavior based on benign network traffic behavior 30 and known malicious network traffic behavior 32. The network traffic analyzer 22 is further configured to calculate an entropy value for every behavior in the complete profile 28. The network traffic analyzer 22 may be further configured to calculate an entropy value for every behavior in the complete profile 28. The memory 24 is configured to store the complete profile 28. The processor 26 is communicatively coupled to the memory 24 and configured to receive live network traffic 34. The processor 26 is also configured to add every behavior in the complete profile 28 having an entropy value greater than a threshold value to a malicious data exfiltration model 36. The processor 26 is further configured to compare the malicious data exfiltration model 36 to the live network traffic 34 and to flag any and all behavior in the live network traffic 34 as a malicious data exfiltration attempt if the behavior has an entropy value greater than the threshold value, regardless of whether or not the flagged behavior was previously known to be a malicious data exfiltration attempt. In the example embodiment depicted in FIG. 2, the known malicious network traffic behavior 32 is provided by a knowledge base 38 of known malicious tactics and techniques such as, by example only, the MITRE ATT&CK® framework by the MITRE Corporation.

The network traffic analyzer 22 may be any software or hardware tool capable of intercepting, recording, analyzing network traffic communication patterns, and identifying data exfiltration behaviors. Suitable examples of the network traffic analyzer 22 include, but are not limited to flow-based network analysis tools and/or deep packet inspection tools, which collect the real-time and historical records of the network. Specifically, a suitable example of the network traffic analyzer 22 is, but is not limited to, the Wireshark® software application by the Wireshark Foundation. The memory 24 may be any physical memory store that can be accessed/interpreted by a computing device. Suitable examples of the memory 24 include, but are not limited to, a computer memory and a database server memory. The processor 26 may be any computing device capable of performing entropy calculations on live network traffic and for comparing the live network traffic with the complete profile. Suitable examples of the processor 26 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices.

Referring back to FIG. 1, the entropy value calculations (see step $10_d$) may be performed for one or more of the following network-traffic-related actions: domain name system (DNS) queries, runtime executables, hypertext transfer protocol (HTTP) requests, packet delays in the live network traffic, file transfer protocol (FTP) commands, secure shell protocol (SSH) information, SSH file transfer protocol (SFTP) transfers, simple mail transfer protocol (SMTP) communications, Hypertext Transfer Protocol (HTTP) communications, Hypertext Transfer Protocol Secure (HTTPS) communications, and server message block (SMB) data traffic in the live network traffic. Preferably, the method 10 calculates the entropy values for as many network-traffic-related actions as possible.

Figure 3:
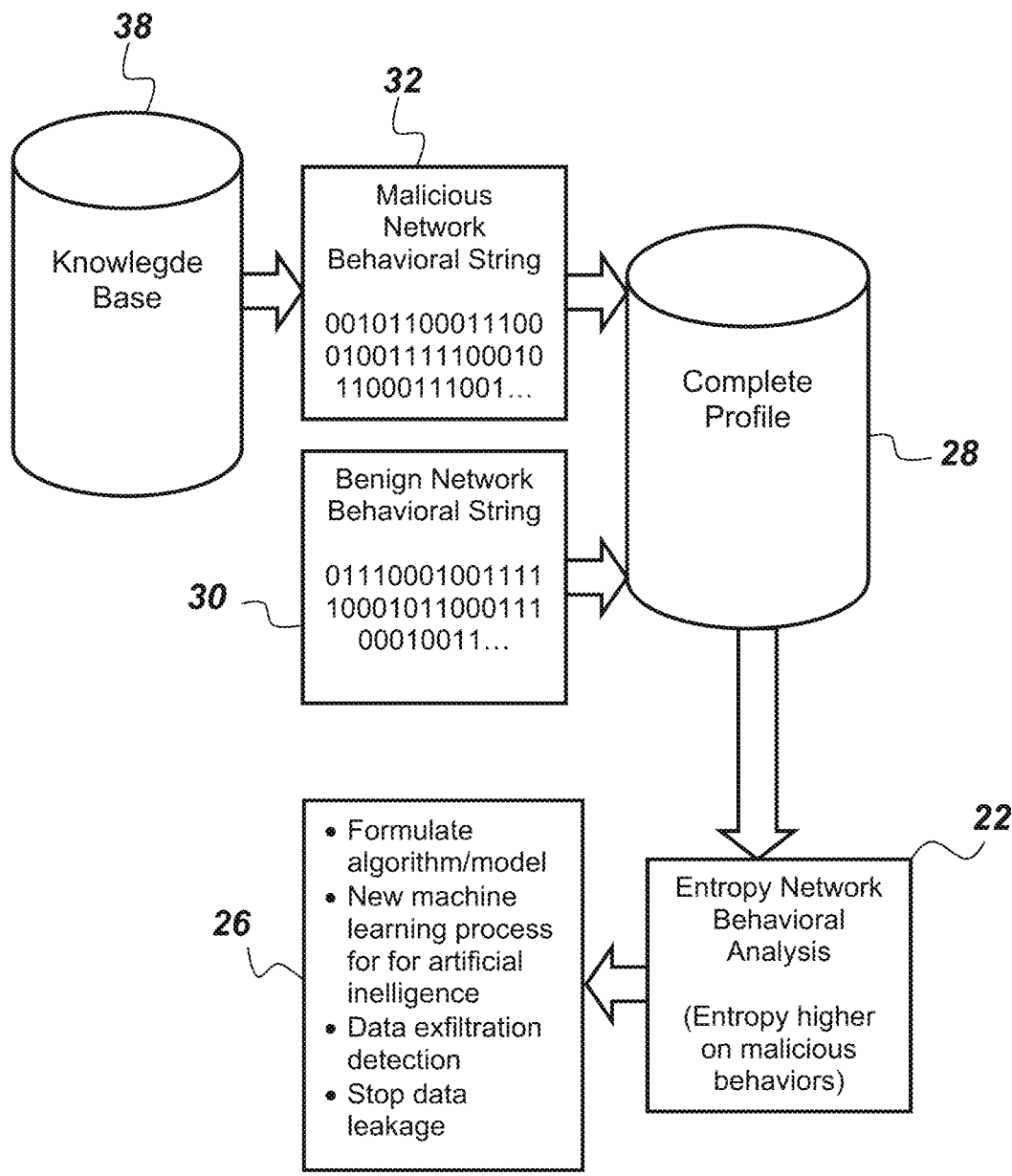
FIG. 3 is a flowchart of an embodiment of a method for identifying data exfiltration attempts on a computer network.

FIG. 3 is a flowchart of an embodiment of method 10. Method 10 may be performed without identifying any known malware. The step of flagging any and all behavior in the live network traffic as a malicious data exfiltration attempt may be performed solely based on the whether or not a given entropy value exceeds the entropy threshold value. The live network traffic may be analyzed by a network protocol analyzer to identify differences between the behaviors in the malicious data exfiltration model and the live network traffic behavior to dynamically update the entropy threshold value. An example of a network protocol analyzer includes, but is not limited to, Wireshark® by the Wireshark Foundation. Any network element responsible for behavior that is flagged as a malicious data exfiltration attempt may then be quarantined. The entropy threshold value may be updated whenever newly-discovered malicious data exfiltration behaviors are added to the malicious data exfiltration model.

Initially, malicious data exfiltration behavior may be emulated with a cybersecurity framework tool such as, but not limited to, CALDERA™, which is a scalable, automated adversary emulation platform created by the MITRE Corporation. Both malicious and benign network behaviors may initially be emulated. Network features having an entropy value higher than the entropy threshold are likely indicators of malicious behavior. Procedures for calculating entropy values for different features may be found in the paper "Analysis and detection of malicious data exfiltration in web traffic" by Areej Al-Bataineh and Gregory White, 2012 7th International Conference on Malicious and Unwanted Software (2012), which paper is incorporated by reference herein. Another paper that describes entropy calculations, which is also incorporated by reference herein is the paper "An Entropy-Based Approach to Detecting Covert Timing Channels" by S. Gianvecchio and Haining Wang, IEEE Transactions on Dependable and Secure Computing 8.6 (2011), pp. 785-797.

Embodiments of method 10 do not rely on signature based detection or policy based detection. Instead, method 10 utilizes network behavioral analysis to identify the data exfiltration behaviors in network traffic that are usually hidden and blended with the normal network traffic patterns.

From the above description of the method and system for identifying data exfiltration attempts on a computer network, it is manifest that various techniques may be used for implementing the concepts of method 10 and system 20 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 and system 20 are not limited to the particular embodiments described herein, but are capable of many embodiments without departing from the scope of the claims.

We claim:

1. A method for identifying data exfiltration attempts on a computer network comprising the following steps:
   identifying malicious data exfiltration behaviors corresponding to all known adversary tactics and techniques stored in a knowledge base;
   identifying benign data exfiltration behaviors corresponding to emulated benign network traffic behaviors;
   comparing the malicious data exfiltration behaviors with the benign data exfiltration behaviors to identify network features that indicate malicious data exfiltration activity;
   calculating, with a network analyzer, an entropy value for each identified network feature;
   establishing an entropy threshold value based on the calculated entropy values for the identified network features;
   building a complete profile of data exfiltration behavior based on the benign and malicious data exfiltration behaviors;
   adding every network feature having an entropy value greater than the entropy threshold value to a malicious data exfiltration model;
   comparing the malicious data exfiltration model to live network traffic; and
   flagging any and all behavior in the live network traffic as a malicious data exfiltration attempt if such behavior includes a network feature that has an entropy value greater than the entropy threshold value regardless of whether or not the flagged behavior was previously recognized as a malicious data exfiltration attempt.

2. The method of claim 1, wherein entropy value calculations are performed for all domain name system (DNS) queries, runtime executables, hypertext transfer protocol (HTTP) requests, and packet delays in the live network traffic.

3. The method of claim 2, wherein no malware is identified during any of the steps.

4. The method of claim 3, further comprising analyzing the live network traffic with a network protocol analyzer to identify differences between the behaviors in the malicious data exfiltration model and the live network traffic behavior.

5. The method of claim 4, wherein the step of flagging any and all behavior in the live network traffic as a malicious data exfiltration attempt is performed solely based on the whether or not a given entropy value exceeds the entropy threshold value.

6. The method of claim 1, further comprising the step of quarantining any network element responsible for the behavior that is flagged as a malicious data exfiltration attempt.

7. The method of claim 2, further comprising performing entropy value calculations for all file transfer protocol (FTP) commands, secure shell protocol (SSH) information, SSH file transfer protocol (SFTP) transfers, simple mail transfer protocol (SMTP) communications, Hypertext Transfer Protocol (HTTP) communications, Hypertext Transfer Protocol Secure (HTTPS) communications, and server message block (SMB) data traffic in the live network traffic.

8. The method of claim 6, further comprising the step of updating the entropy threshold value when newly-discovered malicious data exfiltration behaviors are added to the malicious data exfiltration model.

9. A system for identifying data exfiltration attempts on a network comprising:
   a network traffic analyzer configured to build a complete profile of data exfiltration behavior based on benign network traffic behavior and known malicious network traffic behavior, wherein the network traffic analyzer is further configured to calculate an entropy value for every behavior in the complete profile;
   a memory configured to store the complete profile; and
   a processor communicatively coupled to the memory and configured to receive live network traffic, wherein the processor is further configured to add every behavior in the complete profile having an entropy value greater than a threshold value to a malicious data exfiltration model, wherein the processor is further configured to compare the malicious data exfiltration model to the live network traffic, and wherein the processor is configured to flag any and all behavior in the live network traffic as a malicious data exfiltration attempt if the behavior has an entropy value greater than the threshold value regardless of whether or not the flagged behavior was previously known to be a malicious data exfiltration attempt.

10. The system of claim 9, wherein the processor is further configured to calculate entropy values for all domain name system (DNS) queries, runtime executables, hypertext transfer protocol (HTTP) requests, and packet delays in the live network traffic.

11. The system of claim 9, wherein no malware is identified by the processor.

12. The system of claim 9, further comprising a network protocol analyzer configured to analyze the live network traffic to identify differences between behaviors in the malicious data exfiltration model and the live network traffic behavior.

13. The system of claim 11, wherein the processor is configured to flag any and all behavior in the live network traffic as a malicious data exfiltration attempt solely based on the whether or not a given entropy value exceeds the threshold value.

14. The system of claim 9, wherein the processor is further configured to quarantine any network element responsible for the behavior that is flagged as a malicious data exfiltration attempt.

15. The system of claim 10, wherein the processor is further configured to perform entropy value calculations for all file transfer protocol (FTP) commands, secure shell protocol (SSH) information, SSH file transfer protocol (SFTP) transfers, simple mail transfer protocol (SMTP) communications, Hypertext Transfer Protocol (HTTP) communications, Hypertext Transfer Protocol Secure (HTTPS) communications, and server message block (SMB) data traffic in the live network traffic.

16. The system of claim 9, wherein the processor is further configured to update the threshold value when newly-discovered malicious data exfiltration behaviors are added to the malicious data exfiltration model.

\* \* \* \* \*